March 21, 1967 D. M. WRIGHT 3,310,178

REEL STORAGE APPARATUS

Filed Feb. 18, 1966 4 Sheets-Sheet 1

INVENTOR.
DAVID M. WRIGHT
BY

Dike, Thompson, Bronstein & Mrose
ATTORNEYS

INVENTOR.
DAVID M. WRIGHT
BY
Dike, Thompson, Bronstein & Mrose
ATTORNEYS

REEL STORAGE APPARATUS

Filed Feb. 18, 1966 4 Sheets-Sheet 3

INVENTOR.
DAVID M. WRIGHT
BY
Dike, Thompson, Bronstein & Mrose
ATTORNEYS

March 21, 1967 D. M. WRIGHT 3,310,178

REEL STORAGE APPARATUS

Filed Feb. 18, 1966 4 Sheets-Sheet 4

INVENTOR
DAVID M. WRIGHT
BY,
Dike, Thompson, Bronstein & Mrose
ATTORNEYS 3,310,178
REEL STORAGE APPARATUS
David M. Wright, Shrewsbury, Mass., assignor to Barry Wright Corporation, Watertown, Mass., a corporation of Massachusetts
Filed Feb. 18, 1966, Ser. No. 538,515
31 Claims. (Cl. 211—40)

This application is a continuation-in-part of my copending application Ser. No. 428,520, filed Jan. 27, 1965, for "Reel Storage Apparatus" now abandoned.

Both the earlier and the present inventions relate to the storage of reels of record bearing media, and, more particularly to the protective storage of such reels in a way that permits high-density filing and convenient accessibility.

Data processing commonly requires the extensive use of a record bearing medium such as magnetic tape. Tapes of arbitrary length are commonly wound on individual spools or reels. To facilitate processing it is important that tape reels be adapted for compact storage and swift retrieval. Some conservation of storage space has been realized by exploiting the spool of the tape as part of a protective enclosure for its contents, without necessitating a separate container or case. Nevertheless the filing of self-contained tape units has remained relatively wasteful of storage space principally because of the need to provide ample space to permit secure handling of the units as they are inserted and withdrawn from storage receptacles. It is therefore one of the objects of the invention to achieve compact and readily-accessible filing of reels of record bearing media. Another object is to obtain high-density storage of tape reels. A further object is to provide for secure support, storage and transportation of tape reels, including provision for the selective removal of individual reels.

In accordance with the present invention the foregoing and related objects are realized by enclosing and stiffening the normally-open periphery of a reel of a record-bearing medium with a flexible band having a special form of latch on its exterior. The band is desirably of a material which is stretchably drawn over the periphery of the reel to provide a relatively dust-proof seal. The latch, on the other hand, which draws the band over the peripheries of the reel, is of a relatively non-stretchable material to maintain the fastness of the seal.

Further, in accordance with the invention, provision is made for hanging the enclosed reels in close side-by-side relationship from a cooperating rack which separably receives the reels and include an ejection-assist mechanism to facilitate the removal of selected reels.

For one embodiment of the invention, the record bearing medium is magnetic tape wound on reels of a type with a central hub that joins a pair of spaced and generally circular side walls. The reels have their normally-open peripheries closed by flexible plastic bands which fit with and preserve, a predetermined separation or gap between the outer edges of the side walls. Each such band includes a known form of latch for securing the ends of the band together and, further, an external hanger that extends radially at an angle with respect to the band. The hanger is of a width less than that of the band and is in the general form of a hook opened along one side. A cooperating storage rack for the reels includes a substantially horizontal support rod adjacent portions of the support rod have a width only slightly in excess of that of the hangers and are separated from one another by transversely-extending barriers such that the hangers may be engaged and suspended in a non-sliding relationship with the rod. To the rear of the rod, a spring-biased bar is disposed for engagement with, and deflection by, any of the suspended reels which a user may selectively press from the front. Upon release, the deflected bar swings the selected reel forward to a position where it temporarily projects out of alignment with the other reels and may be securely grasped by the user and manipulated to free the hanger from the support rod.

According to one aspect of the invention, the flexible plastic band is of stretchable material, such as polyethylene, and the latch is of a relatively non-stretchable material, such as polypropylene. The latch is advantageously mounted exteriorly in two portions attached to respective ends of the band. When the latch is fastened, the two ends of the band are stretchably drawn over the reel being enclosed. Because of the stretchability of the band, a relatively dust-proof seal is formed. In addition, a stretchable band does not give rise to plastic particles of the kind which can be incident to the use of a plastic reel with a hard plastic band. Moreover, because the latch is of a relatively non-stretchable material, the stretched band enclosing the reel is held fast under all conditions of anticipated use.

Polyethylene has been found to be particularly suitable for the stretchable band because it permits the band to be used repeatedly as a reel closure and be subsequently flattened for storage when it is not being so used. Furthermore, polyethylene is an inert plastic which does not react with the material of the ordinary tape reel. Polypropylene has been found to be suitable for the latch because it provides firm closure and also because of its "hinge effect," by which there is a crystalline orientation at the hinge, allowing the latch to be operated repeatedly over a prolonged period without becoming severed.

When the band is employed in conjunction with a hanger, the latter also is of a relatively non-stretchable material. Attachment of the non-stretchable hanger to the stretchable band is advantageously accomplished, in part, by way of a tab which enters an aperture in the band and provides support for the hook from the underside of the band. As a result, a durable hook is provided without detracting from the preferred stretchability of the band. In addition there is less tendency for the hook to become severed from the band under the weight of a loaded reel.

According to another aspect of the invention, the hook and one portion of the latch may be combined at one end of the band. Further, the hanger desirably has an end which is turned downwardly with respect to the band at an angle such that a sealed tape unit, suspended from a support by the hanger, will not tend to become accidentally dislodged.

According to a further aspect of the invention each band may include, on its exterior side, an integrally-molded holder which adapted to loosely trap a label for identifying the contents of an enclosed reel. Since the label is loosely trapped, it readily adjusts to the enclosure configuration of the band without damage.

Although the aspects of this invention which are believed to be novel are set forth in the appended claims, additional details as to preferred practices and as to the further objects, advantages and features thereof may be most readily comprehended through reference to the following description taken in connection with the accompanying drawings, wherein:

Figures 3, 4:
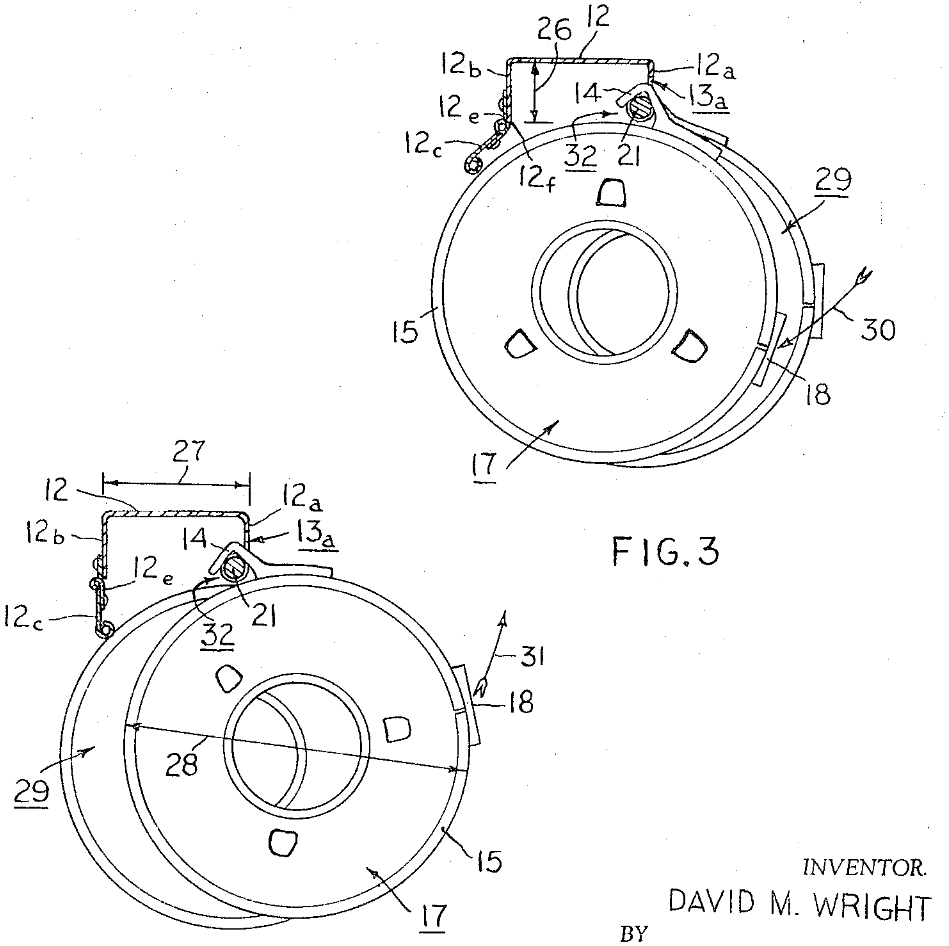
FIGURE 3 depicts in a side view an assembly, such as that of FIGURE 1, wherein one of several reels has been deflected rearwardly for ejection purposes.
Figure 5:
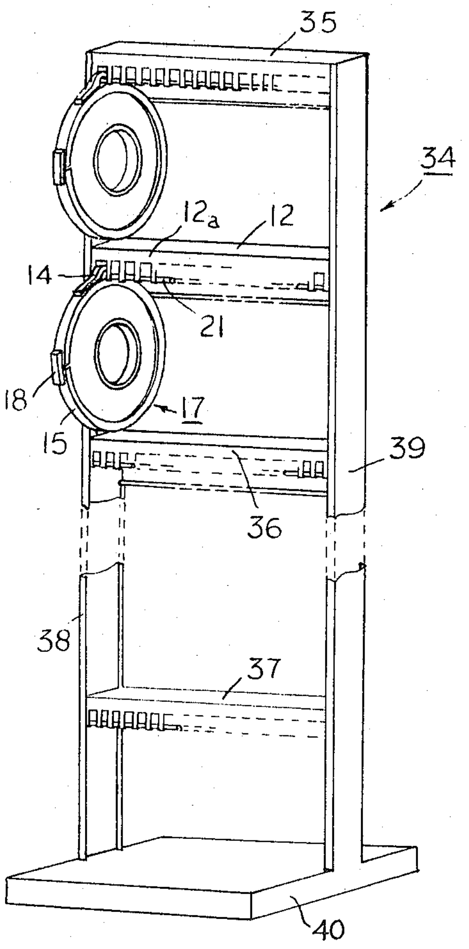
Figure 6:
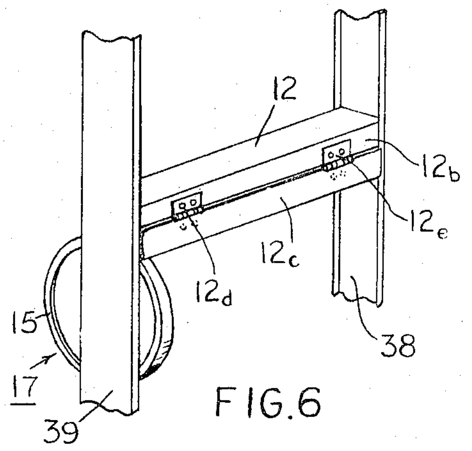
Figure 7:
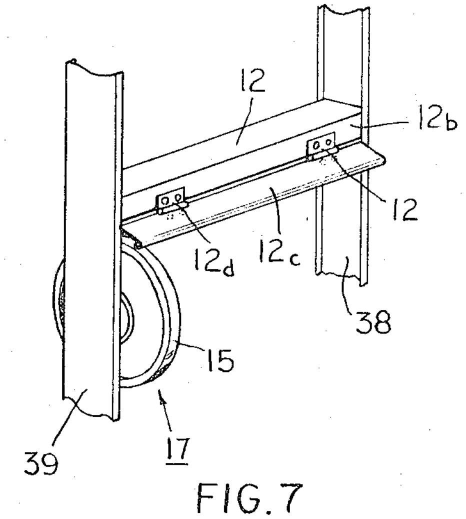
Figure 8:
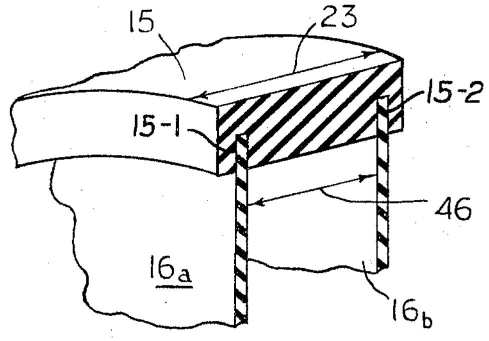
Figure 9:
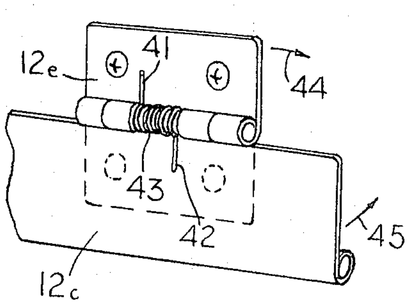
Figures 10, 11:
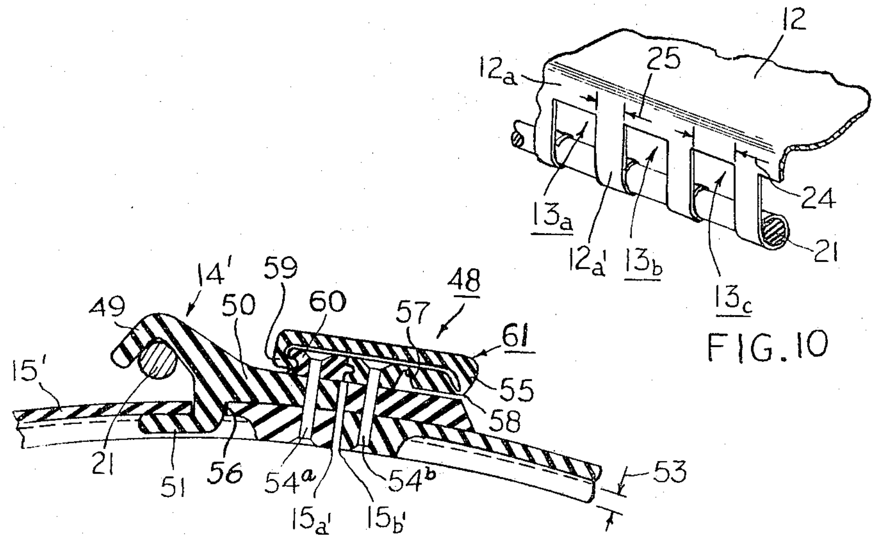
Figures 12, 13, 14:
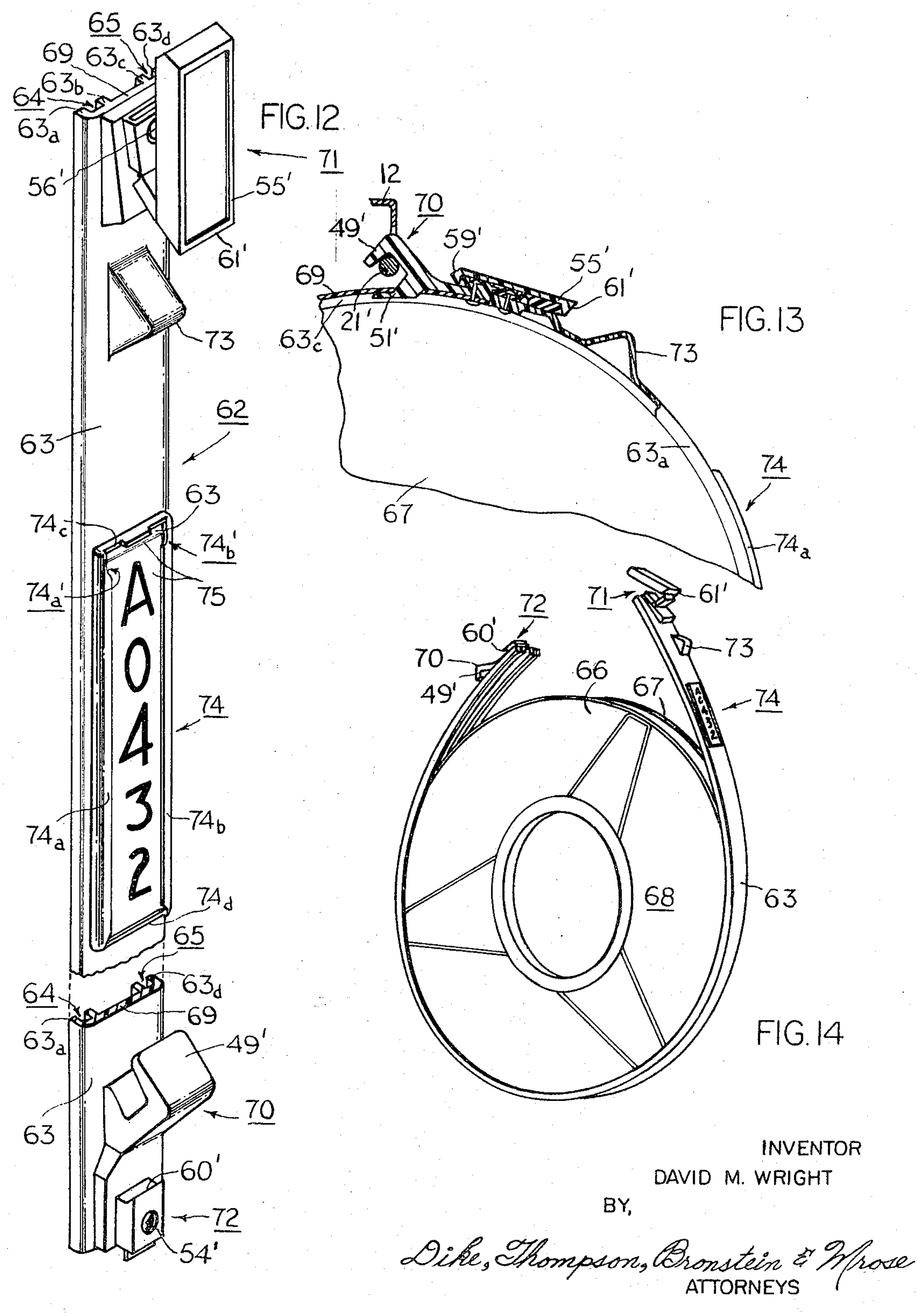

FIGURE 4 provides another side view of the assembly of FIGURE 3 with the deflected reel being temporarily sprung forward for convenient selectable access;

FIGURE 5 illustrates portions of a library-type storage rack for tape reels, some of which are shown mounted on the rack;

FIGURE 6 is a view, from the rear, of a portion of the assembly of FIGURE 5;

FIGURE 7 provides a view, from the rear, of the same portion of the assembly shown in FIGURE 6, with a tape reel deflected rearwardly;

FIGURE 8 depicts an enlarged fragment of a tape reel and cover;

FIGURE 9 portrays a spring-type hinge in association with part of an ejection bar for the improved storage rack;

FIGURE 10 illustrates a fragment of a support rod mounting in the improved storage rack;

FIGURE 11 is a cross-section of a combined latch and hook-type catch for a tape reel cover;

FIGURE 12 illustrates a further embodiment, with portions broken away, of an improved tape reel cover including a guard which shields against unintentional opening of its latch, as well as a mount for a removable label;

FIGURE 13 provides a cross-sectioned side view of the reel cover of FIGURE 12 shown in association with a fragment of a tape reel and hung from a support; and FIGURE 14 represents the same reel cover unlatched and wrapped partially around a tape reel.

Figure 1:
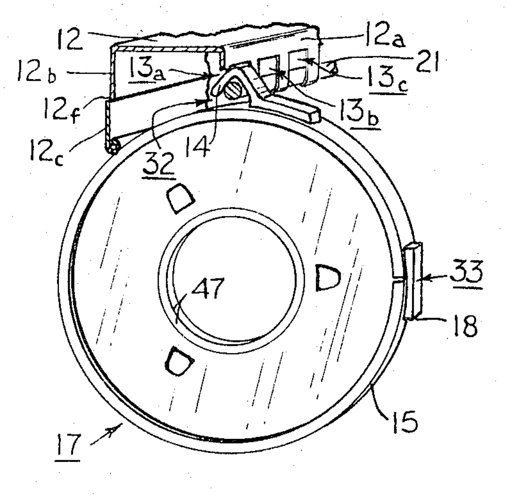
FIGURE 1 is a perspective view of a covered reel having a catch suspending it from a portion of a storage rack.
Figure 2:
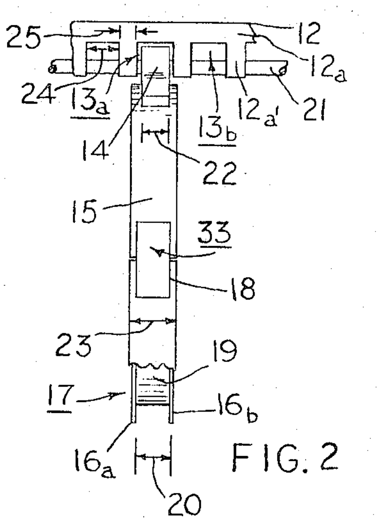
FIGURE 2 illustrates the same assembly, from the front, with a portion of the reel cover being broken away to expose the reel structure.

The storage apparatus portrayed in FIGURES 1 and 2 includes a horizontally-suspended elongated sheet metal rack member 12, the load-supporting strength of which is enhanced by its inverted channel-type configuration. One of the depending sides 12*a*, which is considered as the front, is formed with a horizontally-extending row of closely-spaced apertures, such as apertures 13*a*–13*c*, into each of which may be inserted the hook-shaped end of a reel hanger 14 affixed to the outer periphery of a flexible band 15 secured in the illustrated enclosing relationship to the parallel circular sides 16*a* and 16*b* of a reel 17 of tape or the like by a latch unit 18. Typically, a magnetic tape 19 currently used with certain data-processing equipment has a width 20 of about one-half inch and may comprise a plastic base coated with iron oxide particles; in the case of reels such as 17, having a diameter of about ten and one-half inches, the weight of a fully-packed reel is substantial, and the supporting rack member must be capable of withstanding the total loading imposed by a large number of these reels. For the latter reason, the lower edge of the front side is wrapped about and secured, as by welding, to a stiff straight cylindrical hanger rod 21 which is exposed along the lower edges of the apertures 13*a*, etc., and is readily mated with the reel hanger 14. As is shown in FIGURE 2, the latter hanger is of a width 22 which is less than the width 23 of the reel band 15 to which it is secured, and it is also just slightly less than the uniform width 24 of each of the apertures 13*a*, etc. The barrier portions 12*a'* between the adjacent apertures are of a uniform width 25 just slightly in excess of the width required to keep adjacent reels from locking or jamming with one another when the adjacent apertures accommodate hung reels; that is, the total of one aperture width 24 and one barrier width 25 must slightly exceed the width 23 of the reel bands. Rack 12 extends, heightwise, only that very short distance 26 (FIGURE 3) above the tops of the reels which is needed to accommodate slight forward and upward lifting of the reels as they are withdrawn from engagement with the hanger rod, and reverse rearward and downward lowering of the reels as they are engaged with and hung upon the rod.

The front-to-rear dimension 27 (FIGURE 4) of the rack is preferably selected to be less than half the overall diameter 28 of the band-enclosed reels, whereby the ejection-assist sheet metal bar 12*c* suspended below the rear side 12*b* of the rack will normally be engaged with the reel bands at an upper position as shown in FIGURES 1, 3 and 4. As is discussed in greater detail later herein, the ejection-assist bar 12*c* normally hangs vertically (as shown in FIGURES 1 and 4), where it is held against mechanical stops by spring-loaded hinges, such as hinge 12*e*, which resiliently resist rearward deflection of the bar from the stopped position. However, spring-loaded bar 12*c* may be deflected rearwardly (FIGURE 3) when one of the suspended reels, such as reel 17, is pressed to the rear by an operator who has selected it for withdrawal from the rack. An adjacent reel 29 is there depicted in the undeflected position, where it and others like it are normally oriented by gravity. Manually-induced pivotal motion of the deflected reel 17 first occurs in the direction of arrow 30, about the axis of rod 21, and the hook-shaped reel hanger 14 prevents accidental separation from the rod at such times. The fixed lower edge 12*f* of rear side 12*b* of the rack serves as a mechanical stop limiting the extent of such pivotal movement to an amount which does not permit the hanger 14 to become detached from the rod 21. Finger pressure on the reel suffices to deflect it in the manner shown (FIGURE 3), without disturbing the immediately-adjacent closely-spaced reels which may be on both sides. Upon release of finger pressure, the rearwardly-pivoted reel 17 is swung forward in the direction of arrow 31 by the spring-biased bar 12*c*, and its momentum continues its forward pivoting to a position such as that represented in FIGURE 4, even though the ejection-assist bar has been halted at its vertical stopped orientation. The selected reel thus projects forward momentarily, out of line with the other stacked reels, and may thus be readily grasped by the operator. It is then withdrawn merely by lifting it upwardly and forwardly, to free the reel hanger 14 from the hanger rod 21. At other times, the spring-loaded bar serves to damp and stop unwanted pendulous swinging movements of the tapes about the rod, particularly when a reel is being added to the stack or when the stack is mobile and is being transported. The downwardly-curved hook-shaped end of reel hanger 14 is open at one end at the illustrated position, 32, near the reel band and the opening is just slightly higher than the diameter of the hanger rod 21. So long as the encased reel is suspended by gravity, the hanger rod is safely entrapped by the hook-shaped end of reel hanger 14, and it is separated only when intentionally lifted and brought forward by the operator. In engaging a reel with the support, its band periphery may simply be abutted against the hanger rod and the reel then turned slightly to cause the reel hanger to catch with the rod.

All of the reel bands are similarly formed, with the hook-type hangers in a predetermined relationship to the ends of the band. This insures that all of the latches, such as 18, or all labels on the bands at these sites, such as the exterior 33 of the latch, must be oriented the same way in relation to the front of the rack. By way of distinction, in other known stacking arrangements, the labels affixed to rims of reel cases may be misaligned or hidden because of accidental rotation or careless stacking. A library-type stack arrangement 34 depicted in FIGURE 5 permits an unusual high-density storage of reels, with a plurality of horizontal racks, including rack 12 and others (35–37) like it, being supported in a vertically-tiered relationship by a pair of upstanding framework members 38 and 39. A base 40 is shown mounting the entire open assembly, although in other alternative constructions the racks may be part of a mobile truck-type unit or may be enclosed within cabinetry. The successive racks may be stacked very closely, with only little clearance required between the top of any rack and the lowermost edges of the band-encased reels of the next-higher rack. Two hinges 12*d* and 12*e*, are illustrated in FIGURES 6 and 7 which view one of these racks, 12, from the rear. These laterally-spaced hinges are each preferably of a spring-loaded construction, although a separate spring or other resilient biasing member may instead be used to urge the ejection-assist bar 12*c* strongly to the stopped position shown in FIGURE 6 where the extremities of bar 12*c* abut rear edges of the frame members 38 and 39. A typical construction of a suitable spring-hinge unit, 12*e*, is detailed in FIGURE 9; there, the ends 41 and 42 of a wound coiled spring 43 urge the pivoted halves of the hinge angularly toward one another in the directions 44 and 45 and thereby force the hinged bar 12*c* in the desired direction 45. The deflected orientation of ejection-assist bar 12*c* is illustrated in FIGURE 7, wherein the reel has temporarily been pushed rearwardly for purposes of removal from the rack.

An enlarged fragment of the band-enclosed reel 17 which appears in FIGURE 8 aids in understanding the construction and functions of the band 15. The material of which the band is molded is preferably a tough flexible plastic, and its overall length is about the same as the circumference of the circular plastic reel sides 16*a* and 16*b*. Two parallel recesses 15–1 and 15–2 formed in one side of the band receive the peripheral edges of the reel sides therein and maintain a fixed separation 46 between these flexible sides. This separation is important because the tape held by the reel is rarely wound with its edges precisely in the same planes, and these edges may be seriously damaged if the uncovered reel is grasped or impacted too forcefully near its outer circumference. When the central hub, 47 (FIGURE 1), and the circular sides 16*a* and 16*b* of the reel form a continuous-surfaced enclosure for the tape, the peripheral band 15 then completes a relatively tight and contamination-free enclosure.

The enlarged detail of the front side 12*a* and hanger rod 21 of rack 12, in FIGURE 10, illustrates how the hanger rod may be supported in relation to the apertures 13*a*–13*c* and in relation to the lower edges of the front side. Other hanger and spacer arrangements will occur to those skilled in the art, including the simple alternative of a hanger rod with adjacent portions of a reduced diameter separated by enlargements of the width 25.

An alternative embodiment of reel hanger unit, 14′, is presented in FIGURE 11, and is seen to involve an associated latch portion 48. In general form, unit 14′ is similar to the unit 14 described earlier herein with reference to FIGURES 1–5, in that it includes a hook-shaped end 49 arching upwardly and rearwardly from its integral junction with a base part 50 to an access opening 32′ near the periphery of the flexible plastic band 15′. Hanger rod 21 fits readily through opening 32′ when the reel and band are lifted and drawn toward the operator, although normally the hanger rod tends to be trapped (as shown) against accidental separation from the arched hook-shaped reel hanger. A shaped locking tab element 51 integral with the base part 50 of the reel hanger is fitted into an accommodating opening 56 through the mid-portion of the band (between the peripheral recessed margins, such as the margin 52 having a channel of depth 53 for receiving one of the peripheral edges of a reel side such as 16*a* or 16*b*). Metal rivet 54*a*, which is one of a pair of such rivets, also aids in securing the hanger to the outer periphery of band 15′. The two ends 15*a′* and 15*b′* of the protective closure band are disposed at the site of the hanger, slightly forward of the hook-shaped end 49, and these are secured together, in holding and enclosing relationship to a reel, by the latch portion 48 which includes a catch 55 secured to the outside of the band near the band end 15*b′* by metal rivet 54*b*, which is one of a pair of such rivets. Catch 55, which may comprise a molded polypropylene member, for example, includes two spaced flexure points, 57 and 58, which enable the lip end 59 of the catch to be engaged with or separated from a mating element 60 at the other end 15*a′* of the band when the front end 61 of the catch is raised and lowered. Other suitable forms of latch and catch elements are known or may be devised to serve the same purpose. Similarly, it will be evident that the specifically illustrated form 49 of hook-shaped hanger 14′, or the hanger 14, may be modified somewhat with comparable results. Hanger 14′ may conveniently be molded of polypropylene and band 15′ of polyethylene, although other appropriate materials may be selected instead. In some instances, the hanger (14 or 14′) may be bonded to the outer periphery of the band by cement or the like, and, in others, by way of metal fasteners.

The improved tape reel cover 62 which appears in FIGURES 12–14 includes a molded flexible plastic band 63, which, like band 15′ (FIGURE 11), has four ribs 63*a*–63*d* on one side thereof forming two near-marginal channels 64 and 65, which receive the different peripheral edges of the two different sides 66 and 67 of a reel 68, and leaving a shallow mid-portion 69 for the band. Hanger 70, at one end of the band, and its associated latch elements 71 and 72 at the two ends of the band, include elements which are functionally like the corresponding elements of FIGURE 11, and are therefore simply identified by the same reference characters, with distinguishing single-prime accents added. As is represented in FIGURE 13, the latched assembly of a reel and cover is advantageously suspended from the horizontal hanger rod 21 held by the sheet metal rack member 12. Release of the latch and attendant springing of the cover away from the reel are intended to occur whenever the front end 61′ of the catch 55′ is lifted. Accidental release of any of the heavy hung reels is obviously troublesome and dangerous, and should be avoided; however the exposed catches are so disposed that they may be inadvertently tripped when brushed by other articles or when nearby stacked reels are being removed by an operator. For these reasons, the band 63 is provided with a protective externally-extending protrusion 73 which projects at least about as high above the exterior of the band as does the release end 61′ of the catch 55′ and which is in such closely-spaced relationship to that catch end as to deflect any interfering items while at the same time permitting the operator to insert a thumb or finger and manipulate the catch with little conscious effort. Preferably, the guard or shield protrusion 73 is a hollow integrally-molded part of the band, and is of the illustrated prism-like form.

Labelling for the suspended reels is conveniently applied at one particular locus on the band, preferably corresponding to that which is automatically brought to a convenient front orientation when the hooked reel is hung from a support. A removable strip or tag of paper or the like, which can be readily changed, is desirable. For these purposes, the band is further provided with an integrally-molded label holder 74 on the intended exterior thereof. This generally-rectangular holder is formed by two near-peripheral parallel lips 74*a* and 74*b* which are slightly spaced from the exterior surface of band 63 and extend inwardly toward one another for short distances, and by two end ridges 74*c* and 74*d*. The lip ends are open, as at end sites 74*a′* and 74*b′*, to permit a thin label strip 75, and also a transparent cover strip if desired, to be inserted under and held by the lips. Because the labels (of relatively stiff paper or the like) are only loosely trapped within the holder, rather than secured throughout their lengths, the flexible springy reel covers may extend straight (their natural tendency) or may be bent into the illustrated circular or other configurations without distorting or injuring the labels, which labels can develop accommodating minute slippage in relation to surfaces of the band. Moreover, the label holder is itself of about the same flexibility as the remainder of the band, and may be made relatively long without impairing the desired flexural characteristics of the band.

Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Reel storage apparatus comprising, in combination, at least one reel holder adapted to enclose and support a reel having a central hub and a pair of parallel substantially circular sides fixed with the hub, said holder including an elongated band of stratchable material having flexibility permitting the band to be drawn into and separated from a tight encircling relationship with the reel, said band having means on one side thereof for engaging the peripheries and the inner faces of the circular sides of the reel, a hanger member of non-stretchable material fixed with said band at a predetermined position therealong and projecting outwardly beyond the other side of said band, and means, of non-stretchable material, for releasably securing said band in tight encircling relationship with the reel, a support, and hanger means held by said support, said hanger means including a plurality of horizontally-aligned spaced portions each disposed for a separate separable cooperative hooking engagement by the hanger member of said reel holder.

2. Reel storage apparatus comprising, in combination, at least one reel holder adapted to enclose and support a reel having a central hub and a pair of parallel substantially circular sides affixed thereto, said holder including an elongated band of flexible material, said band having means on one side thereof for engaging the peripheries and the inner faces of the circular sides of the reel for holding in spaced parallel relationship said peripheries of the circular sides of the reel, a hanger member fixed with said band and projecting outwardly beyond the other side of said band at a predetermined position therealong, and means for releasably securing said band in a tight encircling relationship with the reel wherein said band closes the space between the peripheries of said reel sides, a support, and elongated hanger means held by said support and including a row of horizontally-aligned spaced hanger portions each disposed for a separate separable hooking engagement by the hanger member of said reel holder, said hanger member and hanger portions of said hanger means being disposed for hooking engagement and separation by manipulation of said reel holder in directions normal to said row of hanger portions.

3. Reel storage apparatus as set forth in claim 2 wherein said hanger member comprises a hook-shaped member the arching of which is in directions angularly about the reel, said hook-shaped member being of width less than that of said band.

4. Reel storage apparatus as set forth in claim 3 wherein said hanger means includes a rod held substantially horizontally by said support, and spacer means subdividing said rod into a plurality of longitudinally-spaced portions each of uniform length slightly greater than the width of said hook-shaped member, whereby said hook-shaped member may be hung on any of said portions of said rod, said spacer means preventing sliding of said hook-shaped member along said rod.

5. Reel storage apparatus as set forth in claim 4 wherein the sum of the length of one of said portions of said rod and the length of said spacer means between adjacent ones of said portions of said rod is just slightly in excess of the width of said band, whereby a plurality of said reel holders may be suspended side-by-side from said rod in a high-density storage array.

6. Reel storage apparatus as set forth in claim 3 further comprising yieldable means held by said support in position to yieldably engage said reel holder when said reel holder is suspended from said hanger means and is moved angularly in relation to said hanger means in one direction slightly from the vertical, whereby angular movements of said reel holders are damped by engagements between said yieldable means and reel holder.

7. Reel storage apparatus as set forth in claim 6 wherein said yieldable means comprises an elongated member, means mounting said elongated member on said support in substantially parallel relationship with said elongated hanger means and for pivotal movements parallel with said hanger means about a substantially horizontal axis, and means resiliently urging said elongated member angularly about said axis in direction opposite to said one direction.

8. Reel storage apparatus comprising, in combination, a plurality of reel holders each adapted to enclose and support a reel having a central hub and a pair of parallel substantially circular sides affixed thereto, said holders each including an elongated band of flexible material, said band having means on one side thereof for engaging the peripheries and the inner faces of the circular sides of the reel for holding in spaced parallel relationship said peripheries of the circular sides of a reel, a hanger member fixed with said band and projecting outwardly beyond the other side of said band at a predetermined position therealong, and means for releasably securing said band in a tight encircling relationship with a reel wherein said band closes the space between the peripheries of said reel sides, a support, elongated hanger means held by said support and including a row of horizontally-aligned spaced hanger portions each disposed for a separate separable hooking engagement by a different one of the hanger members of said reel holders, said hanger members and hanger portions of said hanger means being disposed for hooking engagement and separation by manipulation of said reel holder in directions normal to said row of hanger portions, and an ejection-assist mechanism including movable means held by said support in position to engage each of the reel holders suspended from said hanger means when it is angularly deflected in one direction slightly from the vertical, and means resiliently urging said movable means in direction opposite to said one direction, whereby manually-induced deflection of any one of said reel holders in said one direction results in rebound deflection thereof in said opposite direction by said movable means to a position where the reel holder projects out of alignment with the other of said reel holders and may be conveniently grasped for manual removal from said hanger means.

9. Reel storage apparatus as set forth in claim 8 wherein each of said hanger members comprises a hook-shaped member the arching of which is in directions angularly about a reel, said hook-shaped member being of width less than that of said band, wherein said hanger means includes at least one rod held substantially horizontally by said support, said hook-shaped member having an opening at one end thereof to receive said rod therethrough, and wherein said movable means includes an elongated, member disposed substantially horizontally in position to engage all of the reel holders hung on said hanger means.

10. Reel storage apparatus as set forth in claim 9 wherein said ejection-assist mechanism includes means mounting said elongated member on said support for pivotal movements about a substantially horizontal axis, spring means urging said elongated member in said opposite direction about said axis, and means mechanically stopping angular movement of said elongated member about said axis at said position where said elongated member is disposed to engage the reel holders.

11. Reel storage apparatus as set forth in claim 10 wherein said elongated hanger means includes an inverted sheetmetal channel member held substantially horizontally by said support, the front downwardly-depending side of said channel member having a horizontally-extending row of apertures therein, said rod being held horizontally at the lower edge of said front side and being exposed through the apertures along the lower parts thereof, and the sum of the width of one of the apertures and of the width of an adjoining space to an adjacent aperture being slightly in excess of the width of said band.

12. Reel storage apparatus as set forth in claim 11 wherein said elongated member is hinged along the lower edge of the rear downwardly-depending side of said channel member, the width of said channel member being less than about half the diameter of the band-enclosed reels suspended from said rod, and wherein said storage apparatus includes a plurality of said hanger means in a vertically-stacked relationship with one another on said support and each spaced vertically from another by a distance accommodating band-enclosed reels therebetween.

13. Reel storage apparatus for use with a reel having a central hub and a pair of parallel substantially circular sides, comprising an elongated band of material having flexibility permitting the band to be drawn into and separated from a tight encircling relationship with a reel, said band having means on one side thereof for engaging the peripheries and the inner faces of the circular sides of a reel, a hanger member fixed with said band at a predetermined position therealong and projecting outwardly beyond the other side of said band, and means for releasably securing said band in tight encircling relationship with a reel.

14. Reel storage apparatus for use with a magnetic tape reel having a central hub and a pair of parallel substantially circular sides, comprising an elongated band of stretchable flexible material, said band having means on one side thereof for engaging the peripheries and the inner faces of the circular sides of a reel for holding in spaced parallel relationship said peripheries of the circular sides of a reel, a hanger member of non-stretchable material, fixed with said band and projecting outwardly beyond the other side of said band at a predetermined position therealong, and means, of non-stretchable material, for releasably securing the two ends of said band together to hold the band in a tight encircling relationship with a reel wherein said band closes the space between the peripheries of the sides of a reel.

15. Reel storage apparatus as set forth in claim 14 wherein said hanger member comprises a hook-shaped member the arching of which is in directions angularly about the reel and which has an opening at one end thereof near the periphery of said band to receive therethrough a rod-like hanger extending in a direction substantially transversely to the reel, said hook-shaped member being of width less than said band.

16. Reel storage apparatus as set forth in claim 15, wherein said hanger member and said band are of plastic material, and wherein said hook-shaped hanger member is arched to produce a recess projecting outwardly beyond the said other side of said band for a distance greater than said opening at said one end of said hook-shaped member, whereby said hook-shaped member tends to trap a rod-like hanger therein against separation therefrom except when said hook-shaped member is intentionally both lifted and moved in direction substantially normal to the rod-like hanger.

17. Reel storage apparatus for use with a plurality of reel holders each adapted to enclose and support a reel having a central hub and a pair of parallel substantially circular sides affixed thereto, the holders each including an elongated band, the band having means on one side thereof for engaging the peripheries and the inner faces of the circular sides of the reel for holding in spaced parallel relationship said peripheries of the circular sides of a reel, a hanger member fixed with the band and projecting outwardly beyond the other side of the band at a predetermined position therealong, and means for releasably securing the band in a tight encircling relationship with a reel wherein the band closes the space between the peripheries of the reel sides, comprising a support, elongated hanger means held by said support and including a row of horizontally-aligned spaced hanger portions each disposed for a separate separable hooking engagement by a different one of the hanger members of the reel holders, the hanger members and said hanger portions of said hanger means being disposed for hooking engagement and separation by manipulation of the reel holder in directions normal to said row of hanger portions, and an ejection-assist mechanism including movable means held by said support in position to engage each of the reel holders suspended from said hanger means when it is angularly deflected in one direction slightly from the vertical, and means resiliently urging said movable means in direction opposite to said one direction, whereby manually-induced deflection of any one of the reel holders in said one direction results in rebound deflection thereof in said opposite direction by said movable means to a position where the reel holder projects out of alignment with the other of said reel holders and may be conveniently grasped for manual removal from said hanger means.

18. Reel storage apparatus as set forth in claim 17 wherein said hanger means includes at least one rod held substantially horizontally by said support and disposed to receive thereon open-ended hanger members fixed with the bands of reel holders, and wherein said movable means includes an elongated member disposed substantially horizontally in position to engage all of the reel holders hung on said hanger means.

19. Reel storage apparatus as set forth in claim 17 wherein said ejection-assist mechanism includes an elongated member disposed substantially horizontally in position to engage reel holders hung on said hanger means, means mounting said elongated member on said support for pivotal movements about a substantially horizontal axis, spring means urging said elongated member in said opposite direction about said axis, and means mechanically stopping angular movement of said elongated member about said axis at said position where said elongated member is disposed to engage reel holders hung on said hanger means.

20. Reel storage apparatus as set forth in claim 18 wherein said elongated hanger means includes an inverted sheet-metal channel member held substantially horizontally by said support, the front downwardly-depending side of said channel member having a horizontally-extending row of apertures therein, said rod being held horizontally at the lower edge of said front side and being exposed through the apertures along the lower parts thereof, and the sum of the width of one of the apertures and of the width of an adjoining space to an adjacent aperture being slightly in excess of the width of the band of a reel holder which is to be hung on said rod.

21. Reel storage apparatus as set forth in claim 20 wherein said elongated member is hinged along the lower edge of the rear downwardly-depending side of said channel member, the width of said channel member being less than about half the diameter of the band-enclosed reels which are to be suspended from said rod, and wherein said storage apparatus includes a plurality of said hanger means in a vertically-stacked relationship with one another on said support and each spaced vertically from another by a distance accommodating band-enclosed reels therebetween.

22. Reel storage apparatus for use with a plurality of reel units, each including a pair of parallel sides and peripheral closure for the sides provided with a peripheral hanger, said apparatus comprising a support, hanger means held by said support and including at least one row of horizontally-aligned hanger portions each disposed for separate separable hooking engagement with a different peripheral hanger of one of the reel units, and ejection-assist means held by said support, said ejection-assist means including resiliently deflectable means positioned to engage peripheries of the reel units which may be hung side-by-side from said hanger means, said resiliently deflectable means being disposed below the level of said row and resiliently resisting deflections of the reel units in one angular direction about said row, whereby manually-induced deflection of any of the reel units in said one direction results in rebound deflection thereof in the opposite direction to a position where that reel unit projects out of alignment with the others and may be conveniently grasped for manual removal from said hanger means.

23. Reel storage apparatus as set forth in claim 22 wherein said hanger means includes a plurality of vertically-stacked rows of said horizontally-aligned hanger portions on said support and each spaced from one another by a vertical distance accommodating the hung reel units therebetween, wherein said ejection-assist means includes a different one of said resiliently deflectable means for each of said rows, and wherein each of said resiliently deflectable means includes a horizontal elongated member pivotally mounted on said support in position to engage all of the reel units hung on a different one of said rows of hanger portions, spring means urging said elongated member in said opposite direction, and stop means preventing relative movement between said elongated member and support beyond a predetermined distance in said opposite direction.

24. Reel storage apparatus for use with a magnetic tape reel having a central hub and a pair of parallel substantially circular sides, comprising an elongated band of flexible material, said band having means on one side thereof for engaging the peripheries and the inner faces of the circular sides of a reel for holding in spaced parallel relationship said peripheries of the circular sides of a reel, a hanger member fixed with said band and projecting outwardly beyond the other side of said band at a predetermined position therealong, and catch means on the other side of said band for releasably securing the two ends of said band together to hold the band in a tight encircling relationship with a reel wherein said band closes the space between the peripheries of the sides of a reel, said catch means including a first catch member near one end of said band which is releasable from a cooperating second catch member near the other end of said band by a lifting manipulation of an end of said first catch member in direction away from said other side of said band, and a protective shield projecting outwardly from said other side of said band at least about as far as said end of said first catch member and in a closely spaced relationship to said end along said other side permitting manipulation of said end while shielding said end against inadvertent lifting thereof.

25. Reel storage apparatus as set forth in claim 24 wherein said band comprises molded plastic material and wherein said protective shield comprises a molded integral protrusion from said other side of said band.

26. Reel storage apparatus as set forth in claim 24 wherein said hanger member is disposed proximately with said other end of said band, whereby said catch means is disposed near the top of a reel when it is hung by way of said hanger member, and wherein said hanger member and said second catch member are secured together.

27. Reel storage apparatus for use with a reel having a central hub and a pair of parallel substantially circular sides, comprising an elongated band of material having flexibility permitting the band to be drawn into and separated from a tight encircling relationship with a reel, said band having means on one side thereof for engaging the peripheries and the inner faces of the circular sides of a reel, a hanger member fixed with said band at a predetermined position therealong and projecting outwardly beyond the other side of said band, means for releasably securing said band in tight encircling relationship with a reel, an a label holder on the other side of said band in predetermined relationship therealong relative to said predetermined position, said label holder comprising lips on said other side framing a shallow opening and shaped to accommodate and hold a thin label of predetermined proportions corresponding to those of the opening.

28. Reel storage apparatus as set forth in claim 27 wherein said band comprises molded flexible plastic material, wherein said lips project integrally outwardly from said other side of said band for a short distance and extend transversely toward one another to define a flexible label-holding frame.

29. Reel storage apparatus as set forth in claim 28 wherein said lips define said frame at a position along said band corresponding to a front orientation on a band-enclosed reel hung by way of said hanger member, whereby a label in said frame is displayed at a frontal position in relation to a hung reel.

30. Reel storage apparatus as set forth in claims 28 wherein a first two of said lips are elongated and parallel with edges of said band, wherein a second two of said lips are parallel and extend transversely to said first two lips to define a rectangular frame, and wherein the ends of said first two lips near one of said second two lips are relatively narrow and thereby permit a thin label strip to slide into the frame at that site.

31. An elongated band for use with a reel having a central hub and a pair of substantially parallel and circular sides, said band comprising:

an elongated strip of stretchable and flexible material having means on the underside thereof for engaging the peripheries and the inner faces of the circular sides of a reel for holding them in spaced relationship;

a latch of non-stretchable material on the outer side of said elongated band for releasably securing two ends thereof in a stretched, encircling relationship with a reel and for enclosing the interval between the peripheries thereof;

said latch including a first member near one end of said band and a second member near the other end of said band, cooperating with the first member, for stretchably drawing the two ends of said band together over the peripheries of a reel.

References Cited by the Examiner

UNITED STATES PATENTS

| | | | |
|---|---|---|---|
| 1,549,423 | 8/1925 | Schaefer | 206—52 |
| 2,330,173 | 3/1943 | Gordon et al. | 312—15 |
| 2,773,727 | 12/1956 | Bradley | 312—10 |
| 2,822,919 | 2/1958 | Kulka | 206—52 |
| 2,922,527 | 1/1960 | Finn | 211—40 |
| 3,033,378 | 5/1962 | Dethardt et al. | 211—126 |
| 3,127,017 | 3/1964 | Dower | 211—13 |
| 3,156,353 | 11/1964 | Harnish | 206—52 |
| 3,251,462 | 5/1966 | Hultgren | 206—52 |

CLAUDE A. LE ROY, *Primary Examiner.*

W. D. LOULAN, *Assistant Examiner.*